US007481701B2

(12) United States Patent
Cusick et al.

(10) Patent No.: US 7,481,701 B2
(45) Date of Patent: Jan. 27, 2009

(54) DEVICE FOR MAKING A SPIRAL INCISION ON A MEAT PRODUCT

(75) Inventors: Richard Scott Cusick, Andover, KS (US); James C. Sbarro, Parkville, MO (US)

(73) Assignee: Farmland Foods, Inc., Kansas City, MO (US)

( * ) Notice: Subject to any disclaimer, the term of this patent is extended or adjusted under 35 U.S.C. 154(b) by 121 days.

(21) Appl. No.: 11/697,909

(22) Filed: Apr. 9, 2007

(65) Prior Publication Data

US 2008/0245208 A1 Oct. 9, 2008

(51) Int. Cl.
*A22C 11/00* (2006.01)

(52) U.S. Cl. ...................................................... 452/177

(58) Field of Classification Search ....................... None
See application file for complete search history.

(56) References Cited

U.S. PATENT DOCUMENTS

| | | | | |
|---|---|---|---|---|
| 2,159,730 | A | | 5/1939 | Voris |
| 2,263,869 | A | | 11/1941 | Bundschu |
| 2,279,071 | A | | 4/1942 | Spang |
| 2,502,379 | A | * | 3/1950 | Hein et al. .................... 83/662 |
| 2,552,046 | A | | 5/1951 | Justice |
| 2,615,196 | A | | 10/1952 | Ohanian |
| 3,095,603 | A | | 7/1963 | May |
| 3,116,514 | A | | 1/1964 | Schmidt |
| 3,257,725 | A | | 6/1966 | Dignard |
| 3,367,379 | A | | 2/1968 | Ryan |
| 3,439,849 | A | * | 4/1969 | Sasagawa et al. .......... 225/96.5 |
| 3,465,802 | A | | 9/1969 | Alea |
| 3,568,242 | A | | 3/1971 | Moore |
| 3,786,703 | A | | 1/1974 | Piel |
| 3,902,388 | A | | 9/1975 | New |
| 3,988,804 | A | | 11/1976 | Regner |
| 4,222,150 | A | | 9/1980 | Andersen |
| 4,384,006 | A | | 5/1983 | Wallick |
| 4,976,029 | A | | 12/1990 | Kennedy |
| 5,067,241 | A | | 11/1991 | Goodman |
| D329,967 | S | | 10/1992 | Kennedy |
| 5,295,895 | A | | 3/1994 | Klyce |

(Continued)

FOREIGN PATENT DOCUMENTS

DE 19950947 U1 5/2000

(Continued)

*Primary Examiner*—Thomas Price
(74) *Attorney, Agent, or Firm*—Shook, Hardy & Bacon LLP

(57) ABSTRACT

A method and device for forming a spiral incision on a meat product that includes a compression plate, a cutting element, a plurality of rollers, and a spacing device. The compression plate is supported by legs and includes an elongated slot therein. The cutting element is positioned in a vertical orientation and has a cutting portion that projects upwardly through the elongated slot. The plurality of rollers are pivotably coupled to guide brackets and are frictionally engaged by a one or more flexible belts such that one roller is rotated concomitantly with another roller. The spacing device adjustably couples the guide brackets and compression plate such that the flexible belts and compression plate are arranged in substantially parallel-spaced relation. In operation, the flexible belts rotatably engage the meat product and draw the it over the cutting element forming a superficial spiral incision of generally uniform depth.

20 Claims, 5 Drawing Sheets

U.S. PATENT DOCUMENTS

| | | | | |
|---|---|---|---|---|
| 5,538,056 | A * | 7/1996 | Thoma | 144/342 |
| 5,746,106 | A | 5/1998 | Hodges | |
| 5,771,771 | A | 6/1998 | Gagliardi, Jr. | |
| 5,904,084 | A * | 5/1999 | Weston | 83/373 |
| 6,018,876 | A | 2/2000 | Hodges | |
| 6,080,055 | A | 6/2000 | Leining | |
| 6,248,013 | B1 | 6/2001 | Thomas | |
| 6,805,044 | B1 * | 10/2004 | Yamamoto | 99/537 |
| 7,065,880 | B2 * | 6/2006 | Howman et al. | 30/114 |
| 7,131,905 | B2 | 11/2006 | Johnson | |

FOREIGN PATENT DOCUMENTS

| | | |
|---|---|---|
| DE | 20115599 U1 | 4/2002 |
| JP | 2059296 | 2/1990 |
| JP | 2218592 | 8/1990 |
| JP | 4131066 | 5/1992 |

* cited by examiner

DEVICE FOR MAKING A SPIRAL INCISION ON A MEAT PRODUCT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

In the field of meat cutlery, cutting tools have been adapted to process a variety of meat products. For example, meat processors often employ cutting tools to slicing cylindrical-shaped meat products (e.g., hotdog). Additionally, more advanced cutting tools allow for controlled slicing in order to achieve a superficial incision about the surface of the meat product. Utilizing a cutting tool to incise a superficial incision will partially expose the interior of the meat product, and may enhance both functional and aesthetic properties of the meat product.

One practical consideration associated with these incisions into the meat product is that heat can penetrate the interior more deeply and more quickly. This, in turn, facilitates thoroughly cooking a hotdog and extensively killing bacteria therein. Moreover, it is advantageous to provide evenly spaced angular incisions—that is, spiral, or helix-shaped superficial cuts—such that steam may escape evenly from the hotdog upon application of heat (avoiding bursting), and so that excess fat may be released and drained through the surface of the hotdog. In addition to the practical considerations, angular incisions promote the aesthetic presentation of a hotdog. For instance, the textured surface formed by the spiral incision may help retain garnish, hold various toppings on the hotdog, and prevent the hotdog from sliding awkwardly on a bun or a serving utensil. As such, an enhanced appearance, presentation, and flavor is achieved.

Cutting tools exist that allow for manually forming a spiral incision. These manual cutting tools are unable to consistently achieve a precise superficial incision at a uniform depth and pitch along the length of the incision into the meat product. In addition, the present methods of utilizing the manual cutting tools are complex—such that operation of these tools is so labor-intensive as to preclude high volume production.

The present invention generally pertains to mechanically forming a spiral incision on a cylindrical-shaped meat product such as a hotdog, sausage, pepperoni, or any other suitable oblong sliceable meat. Significantly, the mechanism is adapted to high volume processing while maintaining a constant pitch of the spiral incision and an invariant depth of the incision into the interior of the meat product. Further, the invention provides a mechanized spiral slicer with a simplistic design that is configured for rapid disassembly promoting maintenance and cleaning of the cutting tool.

BRIEF SUMMARY OF THE INVENTION

Accordingly, the present invention seeks to provide a method and device for making a spiral incision on a cylindrical-shaped meat product including, but not limited to, a hotdog, sausage, pepperoni or any other suitable oblong sliceable meat.

An apparatus for making this spiral incision is provided hereinbelow. The apparatus includes a base, a compression plate, a cutting element, a plurality of rollers, a spacing device, a blade mount device, and a drive mechanism.

The base is comprised of legs and interconnected support members. The compression plate has an upper surface and a lower surface, and is supported by the base at the lower surface. An elongated slot is machined within the compression plate.

The cutting element is positioned in a substantially vertical orientation, and includes a mounting portion and a cutting portion, wherein the cutting portion projects upwardly through the elongated slot. Typically, the cutting element is an elongate blade that is adapted to making a spiral incision on more than one meat products concomitantly. The distance of upward projection beyond the upper surface of the compression plate is substantially uniform along the length of the cutting element such that a generally uniform depth of the spiral incision is formed upon drawing the meat product over the cutting element The plurality of rollers that are pivotably coupled to at least one guide bracket. Additionally, the plurality of rollers are frictionally engaged by one or more flexible belts such that at least one roller is rotated concomitantly with another roller. Typically, the cutting element is angularly disposed in relation to at least one guide bracket.

The spacing device adjustably couples at least one guide bracket and the compression plate such that the one or more flexible belts and the compression plate are spatially arranged to rotatably engage a meat product therebetween. In an exemplary embodiment, the flexible belts and compression plate are arranged in substantially parallel-spaced relation. The spacing device also includes a pivot bar that is pivotably coupled to the guide brackets such that the flexible belts may be angularly disposed in relation to the compression plate.

The blade mount device is fixedly attached to the compression plate and is adjustably coupled to the mounting portion of the cutting element. The blade mount device is adapted to adjust and then set a distance that the cutting portion of the cutting element projects upwardly beyond an upper surface of the compression plate.

The drive mechanism automatically rotates the flexible belts. Typically, the drive mechanism comprises a motor that is electrically coupled to a proportional speed control device.

Additional advantages and novel features of the invention will be set forth in part in a description which follows, and in part will become apparent to those skilled in the art upon examination of the following, or may be learned by practice of the invention.

BRIEF DESCRIPTION OF THE SEVERAL VIEWS OF THE DRAWING

In the accompanying drawings, which form a part of the specification and which are to be read in conjunction therewith, and in which like reference numerals are used to indicate like parts in the various views.

DETAILED DESCRIPTION OF THE INVENTION

Figure 2:
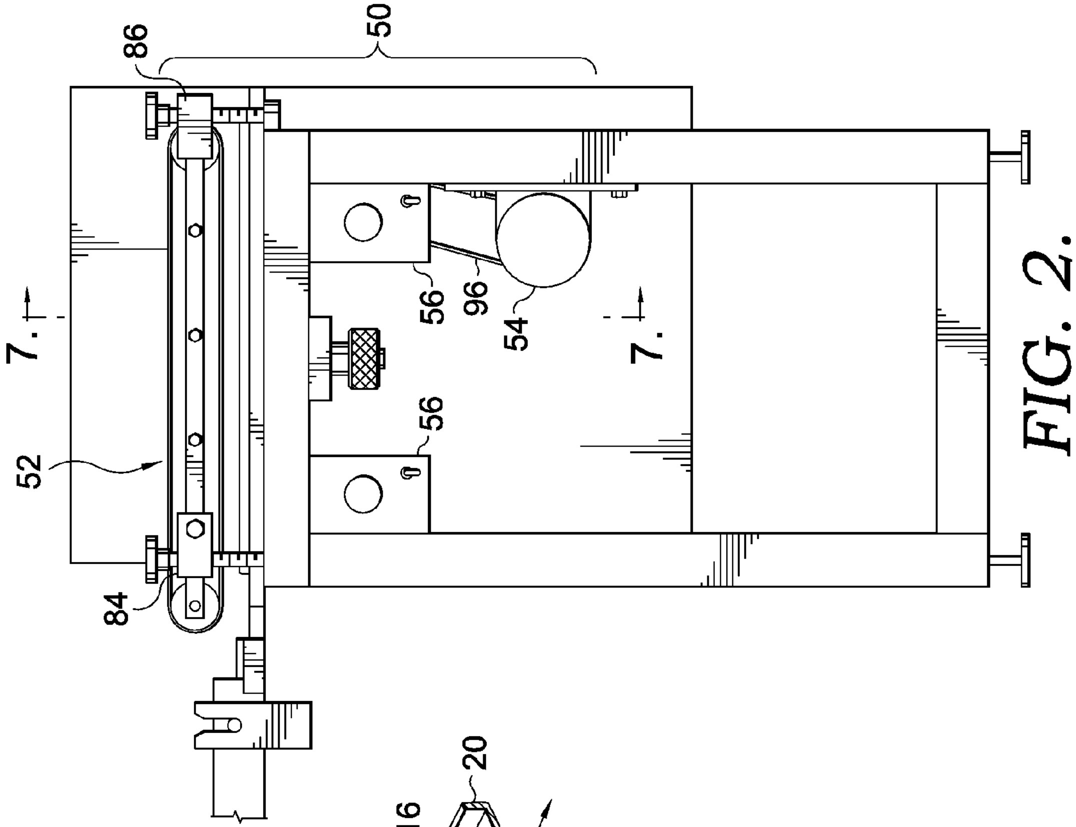
FIG. 2 is a side elevation view of the spiral incising device of FIG. 1.

The present invention is directed to a device and a method for making a spiral incision on a meat product.

Referring to the drawings in greater detail, and initially to FIG. 1, a device for making a spiral incision on a meat product (hereinafter the "spiral incising device") is shown and designated generally by the numeral 10. The spiral incising device 10 is used to form a spiral cut on a meat product. Specifically, the spiral incising device 10 provides a superficial spiral cut to a cylindrically-shaped meat product including, but not limited to, hotdogs, sausages, hot links, bratwurst, pepperoni, and the like. However, for the purposes of the discussion below the spiral slicer will be described as pertaining to processing one or more hotdog(s).

With further reference to FIG. 10, the spiral incising device 10 comprises a base 12, a drive mechanism 50, a cutting mechanism 70, a receiving channel 14, and an exit channel 16. The receiving channel 14 and exit channel 16 are formed with a generally u-shaped cross-section such that the channels 14, 16 each include a set of sidewalls 18, 20 respectively. In an exemplary embodiment, the exposed metallic portions of these components are formed from stainless steel. However, it should be understood that any suitable material may be used. With reference to the receiving channel 14, the set of sidewalls 18 are positioned in a substantially parallel-spaced relation such that a non-incised hotdog 11, i.e., pre-processed with respect to the spiral incision device 10, may be guided into the drive mechanism 50. The set of sidewalls 20 are similarly positioned on the exit channel 16 so that processed hotdogs 13, i.e., cut by the spiral incision device 10, may vacate the drive mechanism 50 of the spiral incising device 10, thus, freeing the up-end flow path for additional non-incised hotdogs 11. In one embodiment, by way of example only, as shown in FIG. 1, the sets of sidewalls 18, 20 are spaced apart from one another in parallel-spaced relation to receive and transport the one or more hotdog(s) 11, 13, widthwise.

Figure 1:
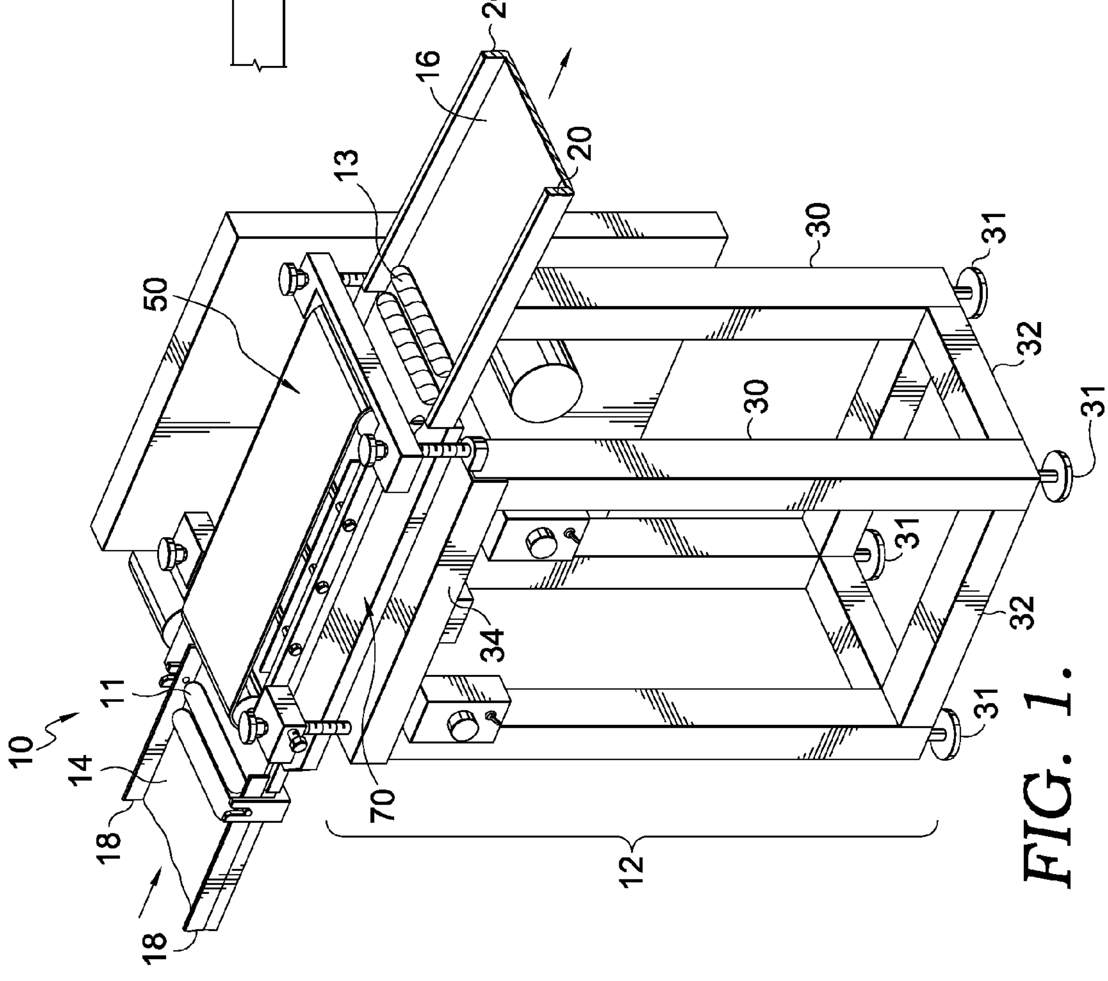
FIG. 1 is a diagrammatic perspective view of a spiral incising device.
Figure 7:
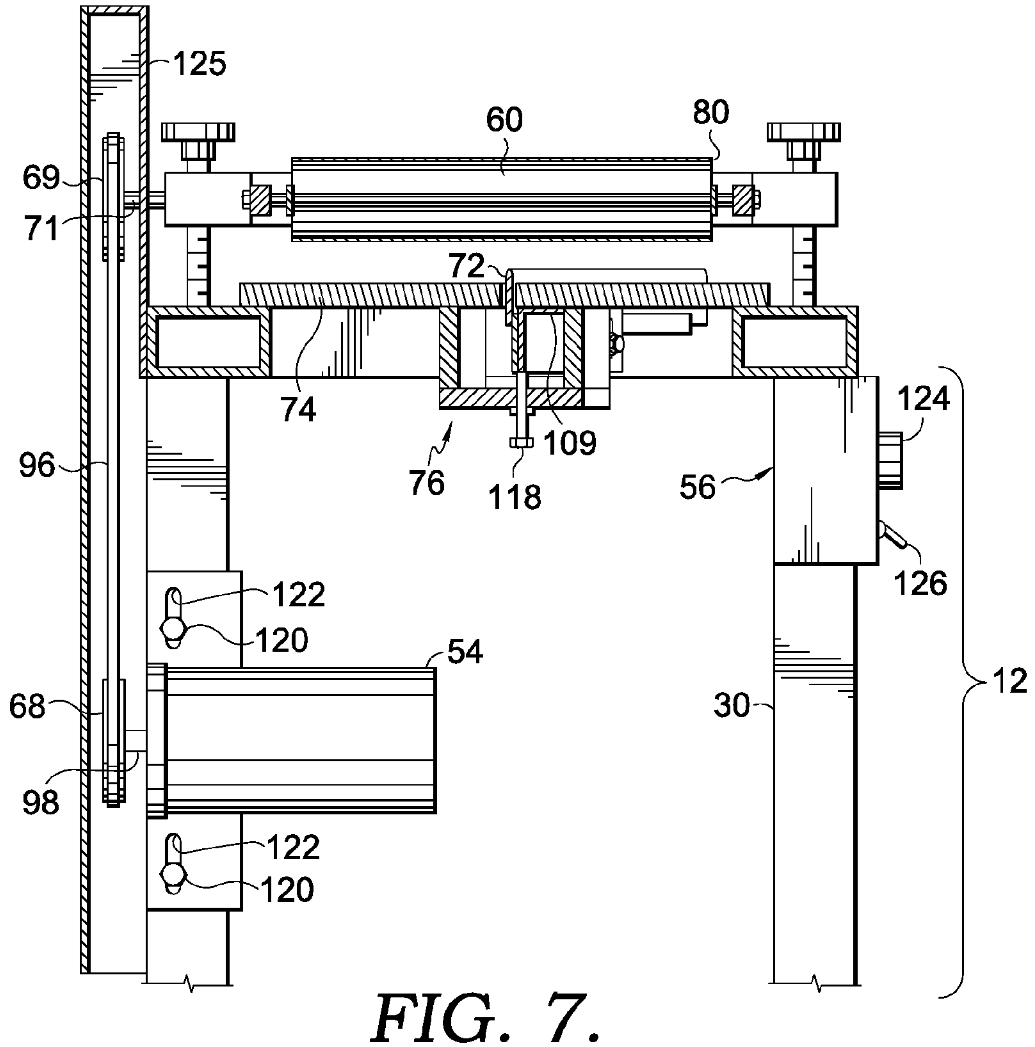
FIG. 7 is a front cross-sectional view of the spiral incising device of FIG. 1 exposing the drive and transfer wheels.

Referring now to FIGS. 1 and 7 the base 12 will be discussed. The base 12 is designed to support the drive mechanism 50, cutting mechanism 70, and the receiving and exit channels 14, 16. The base 12 consists of a plurality of support legs 30, a plurality of lower support members 32, and an upper support member 34. Each of the plurality of support legs 30 include an upper portion and a lower portion. The lower portions are interconnected by the plurality of lower support members 32, while the upper portions are interconnected by the upper support member 34. In one embodiment, as shown in FIG. 1, the base 12 is supported by a plurality of adjustable risers 31 that are mounted on the lower portion of each support leg 30. Each of the plurality of adjustable risers 31 may include a threaded post portion that is threadably engaged to the lower portion of each of the plurality of support legs 30, as such, providing stability on an uneven support surface, or providing an adjustment mechanism to vary the distance of the base 12 above the supporting surface, or both.

Figure 3:
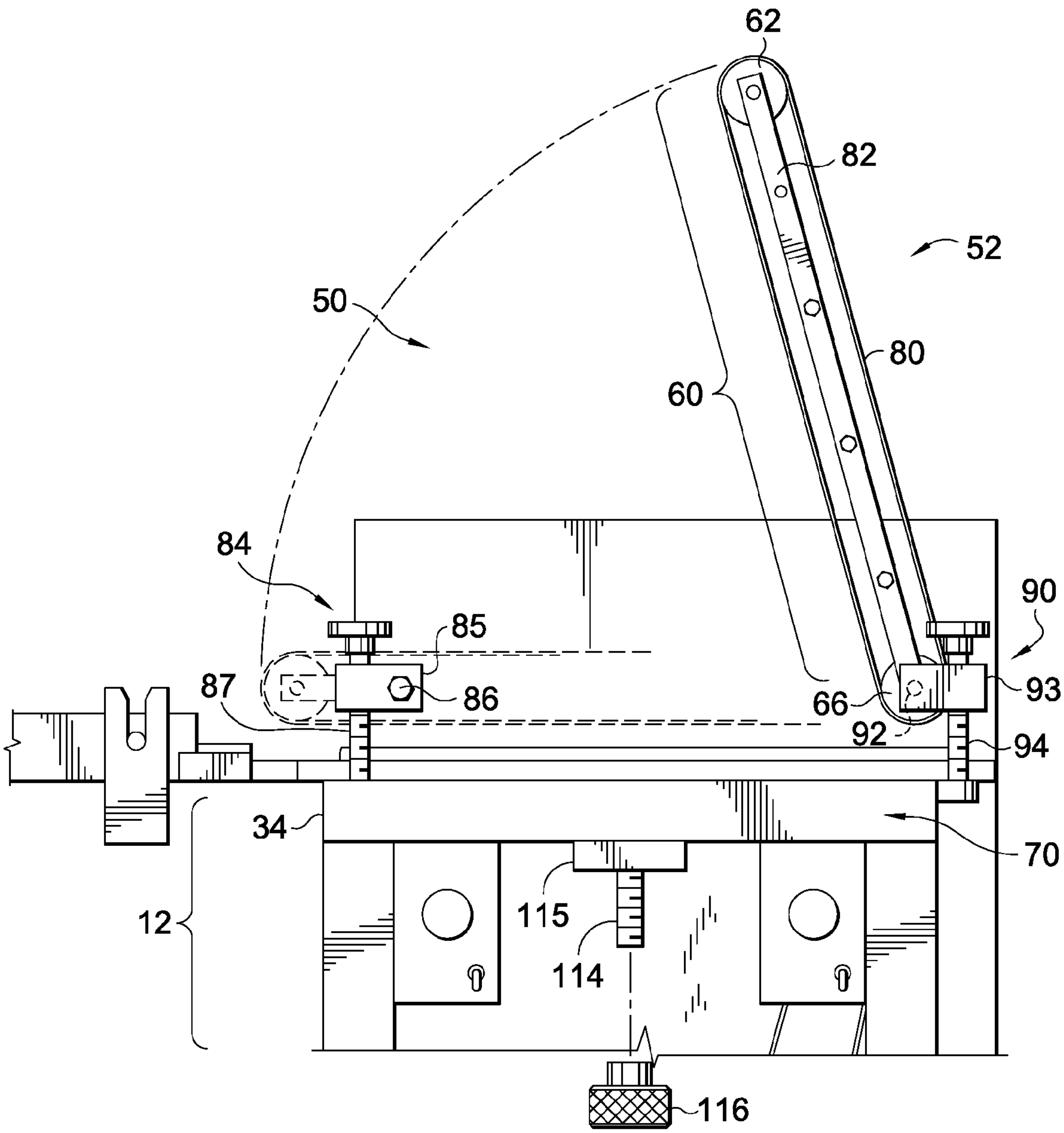
FIG. 3 is an enlarged partial side elevation view of the spiral incising device of FIG. 1 with drive mechanism pivotably raised into a cleaning or a repair position.
Figure 4:
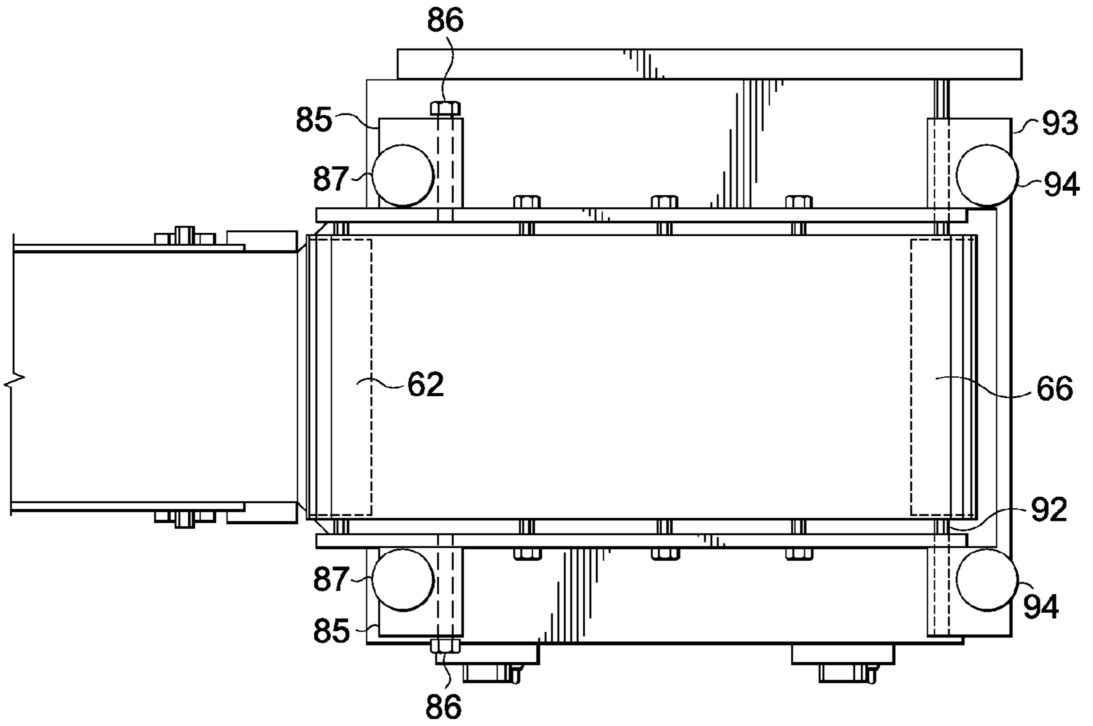
FIG. 4 is an diagrammatic top view of the spiral incising device of FIG. 1, wherein the drive mechanism is in an operational position.

Turning now to FIGS. 2 and 3, the drive mechanism 50 will be discussed. The drive mechanism 50 is configured to receive the non-incised hotdogs 11 concomitantly (typically widthwise) rotatably engage and draw the non-incised hotdogs 11 over the cutting mechanism 50 (FIG. 8), pulling from the receiving channel 14, and delivering the processed hotdogs 13 to the exit channel 16. As shown on FIG. 2, the drive mechanism is comprised of a conveyor 52, forward support units 84, a rearward support unit 86, a motor 54, a drive belt 96, and drive control(s) 56.

The conveyor 52 is utilized to propel (e.g., roll forward) the non-incised hotdogs 11 by rotatably engaging the surface thereof. As best shown in FIG. 3, the conveyor is comprised of a plurality of rollers 60, a processing belt 80, one or more guide brackets 82, a transfer wheel 69, and a transfer shaft (FIG. 7). The plurality of rollers 60 includes a front roller 62, optional intermediate roller(s) (not shown), and a rear roller 66. The front, intermediate, and rear rollers, 62, 66, are rotatably interconnected by the processing belt 80 and frictionally engaged thereto. That is, the processing belt 80 is frictionally engaged to the rollers 62, 66, and couples the rollers 62, 66, so that they rotated concomitantly with each other. Consequently, when torque is applied to one or more of the plurality of rollers 60, the processing belt 80 moves therewith, rotating the remainder of the plurality of rollers 60.

The processing belt 80 is typically comprised of a flexible durable material, e.g., synthetic or rubber, and serves to guide the non-incised hotdogs 11 during processing. Although the processing belt is expressed in the singular, one of ordinary skill in the art would understand and appreciate that multiple belts may be used, for instant spaced bands. Further, it is contemplated by this invention that the processing belt my have a texture formed therein to enhance frictional engagement with the rollers 62, 66, the hotdog(s) 11, 13 (see FIG. 1 for all subsequent references to hotdogs), or both.

As shown in FIG. 3, to further facilitate rotatable engagement with the hotdog(s) 11, 13, the conveyor device 52 may apply a downward pressure thereon. In one embodiment, each of the plurality of rollers 60 provide an evenly distributed downward pressure on the processing belt 80, which is transferred onto the hotdog(s) 11, 13. In another embodiment, the front roller 62 rear roller 66 are spaced at a distance such as to exert outward lateral force along the length of the processing belt 80 whereby providing tension on the processing belt 80. In this embodiment the tension on the processing belt 80 provides an even downward force on the hotdog(s) 11, 13, during the rotational engagement with the conveyor 52, as such, obviating the need for intermediate rollers (not shown).

The one or more guide brackets 82 are configured to assemble in parallel-spaced relation, as mirror-images of each other, and each includes a plurality of apertures. The guide brackets 82 are made from a generally rigid material, e.g., square steel tubing, sheet metal, or square stock, and generally extend between the front roller 62 and rear roller 66. The guide brackets 82 serve to provide vertical support for the plurality of rollers 60 and hold each roller, 62, 66, in substantially parallel-spaced relation. In one embodiment, the plurality of rollers 60 include intermediate rollers (not shown) that are generally evenly spaced along the length the one or more guide brackets 82. Each of the plurality of rollers 60 are pivotably coupled at each end to the guide brackets 80. In one instance, the pivotable couple is made by a pin, or any other suitable fastener well-known in the food processing industry, that is aligned to, and extends from, a cylindrical axis of one of the plurality of rollers 60. In this instance, the pin is received by one of the plurality of apertures in the one or more guide brackets 82. The corresponding aperture of the plurality of apertures in a complementary guide bracket 82 is configured to receive a pin extending from an opposing end of the one of the plurality of rollers 60. In another embodiment (not shown), the guide brackets 82 are configured to extend downward beyond the plurality of rollers 60 toward the cutting mechanism 70 so as to assist in guiding the one or more hotdogs, 11, 13, during the operation of the spiral incision device 10, i.e., create a channel suitable for guiding the hotdog(s), 11, 13, while being drawn across the cutting mechanism 70.

As best shown in FIG. 3, the forward support units 84 are releasably attached to the guide brackets 82 of the conveyor 52, adjustably coupling the upper support member 34 of the base 12 thereto. The forward support units 84 each include a block 85 with at least one aperture therein, a fastener 86 that is received by, and extends outward from, the at least one aperture, and a height adjustment screw 87. The block 85 is releasably connected to one of the guide brackets 82 via the fastener 86, typically near the pivotable coupling of the front roller 62. In the preferred embodiment, the fastener 86 is a threaded bolt. However, as understood and appreciated by those skilled in the art, other fastening devices may be used as well. The height adjustment screw 87, upon rotational adjustment, acts to raise and lower the block 85 in relation to the base 12 and cutting mechanism 70. In the preferred embodiment, a knob is provided at an upper end of the height adjustment screw 87 such that an operator may raise or lower the block 85, and thereby the conveyor 52, without the need for additional tools.

An advantage of providing for a range of height spacings of the conveyor device 52 above the cutting mechanism 70 is so the drive mechanism 50 is adaptable to receive a multitude of shapes (e.g., circumferential sizes) and styles of meat products, or hotdog(s), 11, 13. Alternatively, the variation of height acts to adjust the distributed downward pressure applied the hotdogs, 11, 13, as they are propelled in a rotational fashion over a cutting element 72, more fully discussed below. Consequently, the depth of the spiral incision that is cut into the processed hotdog 13 may be adjusted; however, upon discontinuing adjustment of the height adjustment screw 87, the depth of the superficial cut throughout the length of the spiral incision is held generally invariant.

The rearward support unit 90, as shown in FIG. 3, is adjustably coupled to the upper support member 34 of the base 12, similar to the forward support units 84, and pivotably coupled to the guide brackets 82 of the conveyor 52. In an alternate embodiment (not shown), both the forward support units 84 and rearward support unit 90 are adjustably coupled directly to a compression plate 74. The rearward support unit 90 includes a block 93 with a plurality of apertures therein, a pivot bar 92 that is received by, and extends between, two of the plurality of apertures, and height adjustment screws 94. The block 93 is pivotably hinged to the guide brackets 82 via the pivot bar 92, typically near, or at, the pivotable coupling of the rear roller 66. In the preferred embodiment, the pivot bar 92 provides a pivotable connection between the guide brackets 82 and the rear roller 66. In addition, the pivot bar 92 serves as the pivotable hinge between the guide brackets 82 and the block 93. However, as understood and appreciated by those skilled in the art, other fastening devices may be used to provide a similar function and are considered by present invention. The height adjustment screw 87, upon rotational adjustment, acts to raise and lower the block 85 in relation to the base 12 and cutting mechanism 70. In the preferred embodiment, as more fully discussed above, a knob is provided—for the purposes discussed above—at an upper end of the height adjustment screw 87, which is easily accessible to a user.

Returning to FIG. 2, the motor 54 and drive controls 56 are depicted and discussed hereinbelow. In one instance, as shown, the motor is fixedly attached, typically with fasteners, to the base 12. In this instance, as best shown in FIG. 7, the motor 54 is provided with arcuate slots 122 that receive bolts 120—or any other suitable fasteners which are well known in the meat processing industry—such that the bolts 120 fixedly attach the motor 54 to one or more of the plurality of support legs 30 and may be loosened without removal to vertically reposition the motor 54 within the range of the arcuate slots 122. An advantage of this configuration is that the tension of the drive belt 96 may be adjusted without disassembling the motor 54 from the spiral incising device 10. As is understood and appreciated by those skilled in the art, other mounting positions for the motor 54 may be used to provide a similar function and are contemplated by present invention.

The drive controls 56 are electrically linked to the motor 54, wherein any electrical linking method as is understood and appreciated by those skilled in the art may be used. In the preferred embodiment, as shown in FIG. 7, the drive controls 56 included a toggle on/off switch 126 and a proportional speed control 124. The toggle on/off switch 126 is adapted to supply power from a power source to the motor 54, while the proportional speed control 124 is a dial that varies the rotational output of the motor 54. The above-illustrated drive controls 56 depict an exemplary configuration only; accordingly, any suitable motor control known in the food processing industry may be used and is contemplated by the present invention.

As depicted in FIG. 7, the motor 54 includes an output shaft 98 and a drive wheel 68. These components rotatably interconnect the motor 54 to the drive belt 96, wherein the drive belt 96 is rotatably interconnected to the conveyor device 52 by way of the transfer wheel 69, and a transfer shaft 71. In particular, the output shaft 98 of the motor 54 is axially coupled to the drive wheel 68, which rotates according to the rotational output of the motor 54. The drive wheel 68 is rotatably connected to the transfer wheel 69 via the drive belt 96. In one embodiment, by way of example only, the drive belt 96 is an endless loop of flexible material that frictionally engages the diameter of the wheels, 68, 69, such that torque is transferred from the motor 54 to the transfer wheel 69.

The transfer wheel 69 is axially coupled to the rear roller 66 by way of a rigid transfer shaft 71 that is fixedly attached therebetween. The transfer shaft 71 is typically axially aligned with both the transfer wheel 69 and the rear roller 66 and partially contained within one of the plurality of apertures within the rear support unit 90. As such, when the motor 54 is activated by the drive control(s) 56, the motor torque is transferred to one of the plurality of rollers 60, thereby causing the processing belt 80 to turn. In one embodiment, a shield structure 125 encloses the wheels 68, 69, to guard against user injury and disallow meat products from entering into the portion of the drive mechanism 50 that interacts with the drive belt 96. In another embodiment the output shaft 98 is rotatably connected via the drive belt 96, to the rear roller 66. Although two different configurations of the rotatable interconnection between the motor 54 and the conveyor device 52 have been discussed, it should be understood and appreciated by those of ordinary skill in the art that a variety of torque transferring techniques could be used, and that the invention is not limited to the embodiments shown or described.

Figure 5:
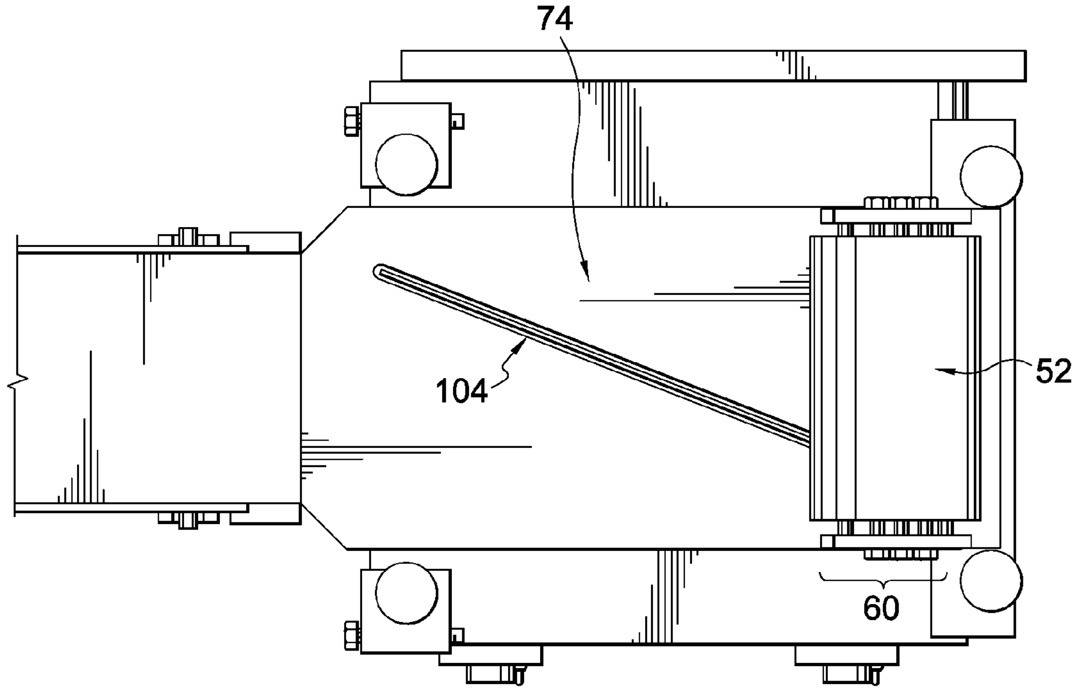
FIG. 5 is a view similar to FIG. 4, but with the drive mechanism in a cleaning or a repair position.
Figure 8:
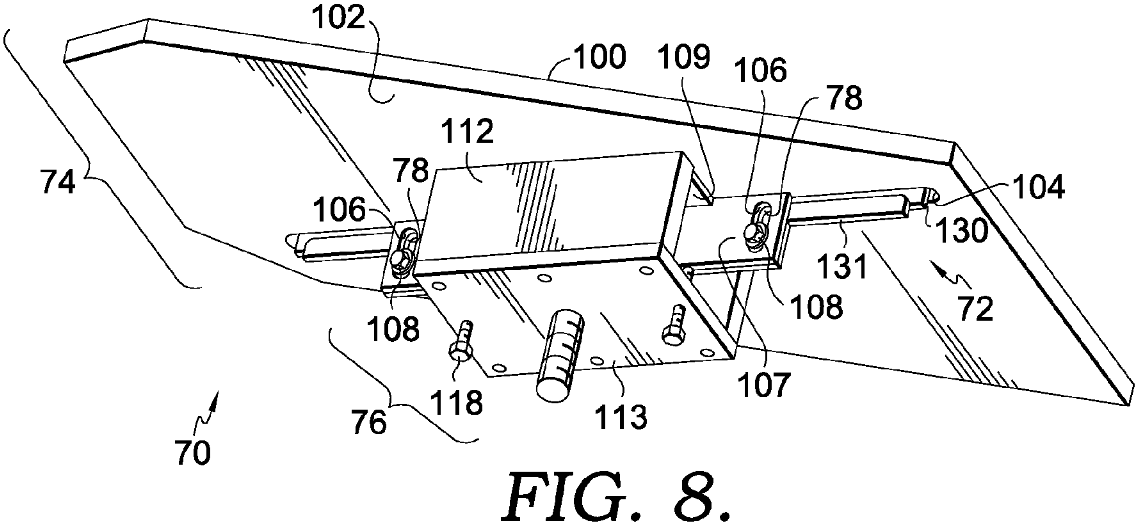
FIG. 8 is an enlarged perspective view of a cutting mechanism fully removed from the spiral incising device of FIG. 1.

Referring now to FIGS. 5-8 the cutting mechanism 70 will be discussed. The cutting mechanism 70 includes a compression plate 74, cutting element 72, and a blade mount device 76. As illustrated in FIG. 8, the compression plate includes an upper surface 100, a lower surface 102, and an elongated slot 104. The compression plate 74 typically rests upon the upper support members 34 (discussed above with reference to FIG. 6) such that the lower surface 102 is fixedly connected thereto. In this exemplary orientation, the upper surface 100 of the compression plate 74 is directed toward the processing belt 80 and positioned in substantially parallel-spaced relation thereto. As best seen in FIG. 5, the elongated slot 104 is machined through the compression plate 74 and oriented diagonally, the importance of which will be more fully discussed below. As will be understood and appreciated by those of ordinary skill in the art, other processes for manufacturing the elongated slot 104, e.g., laser cut, drilling operation, stamping, and the like, are also contemplated by this invention.

The cutting element 72 is typically an elongate metallic blade or cutting tool; however, any material that is adapted to cutting meat products. With reference to FIG. 8, the cutting element 72 is mounted to the compression plate 74 by way of the blade mount device 76, and is received within the elongated slot 104. The cutting element 72 includes a cutting portion 130 and a mounting portion 131, wherein the mounting portion 130 includes elongated apertures 78 that are discussed more fully below. The cutting portion of the cutting element 72 projects upwardly, in a substantially vertical orientation above the upper surface 100 of the compression plate 74. In one embodiment the cutting portion of the cutting element 72 is provided with a serrated edge.

Referring now to FIGS. 7 and 8, the blade mount device 76 will be discussed. The blade mount device 76 is used to couple the cutting element 72 with the compression plate 74 such that the blade mount device 74 provides for the orientation of the cutting element 72 and consequently the depth of the cut in the processed hotdog 13. The blade mount device 76 includes a retention bracket 107, a support bracket 110, adjustment screws 118, and a release mechanism 117. As shown in FIG. 8, the retention bracket 107 includes an L-shaped leg 109 (FIG. 8), arcuate slots 106, and bolts 108. The mounting portion 131 of the cutting element 72 is fixedly attached to the retention bracket 107 by aligning the arcuate slots 106 with the elongate apertures 78 within the mounting portion 131 of the cutting element 72. The bolts 108, or any other suitable fastening device, are received within at least one of the elongate apertures 78 and the associated arcuate slot 106, and extend therethrough, thereby to coupling the cutting element 72 with the retention bracket 107. It should be understood and appreciated by those of ordinary skill in the art that other mounting configurations and hardware could be used, and that the invention is not limited to those bolts 108 and arcuate slots 106 shown and described.

Referring to FIG. 7, the L-shaped bracket 109 is provided to contact the lower surface 102 of the compression plate 74. The L-shaped bracket is typically formed metal and configured to mechanically prevent adjustment by the adjustment screws 118 of the cutting portion 130 of the cutting element 72 once a particular height above the compression plate 74 is achieved.

The blade mount device 76 also includes a support bracket 110 that is fixedly attached to the lower surface 102 of the compression plate 74. The support bracket 110 contains a lower plate 113 and a pair of side walls 112 coupled in a substantially perpendicular orientation thereto. The sidewalls 112 are fixedly attached to the compression plate 74 such that the lower plate 113 and lower surface 102 are set apart in substantially parallel spaced relation. In addition, the lower plate 113 includes threaded apertures to receive the adjustment screws 118, as shown in FIG. 7. The adjustment screws 118 provide for the raising and lowering of the retention bracket 107, and consequently, the cutting element 72.

Raising the cutting element 72 typically comprises rotating the threaded adjustment screws 118. The upper range of adjustment is set by the L-shaped leg 109 of the retention bracket 107 when it contacts the lower surface 102 of the compression plate 74. In raised position (FIG. 7) the cutting portion of the cutting element 72 is exposed above the compression plate 74 so that the non-incised hotdog(s) 11 that pass over the compression plate 74 will receive a superficial spiral incision. In one configuration, the cutting element 72 is evenly projected above the upper surface 100 of the compression plate 74, and thus, cuts a spiral incision on the non-incised hotdog 11 at a generally invariant depth over the length of the incision. Further, adjustment screws 118 allow the user to vary the height of the cutting portion of the cutting element 72 that projects above the upper surface 100 of the compression plate 74. As such, the depth of the incision of the processed hotdog 13 may be adjusted.

Lowering the cutting element 72 typically comprises rotating the threaded adjustment screws 118 in the opposite direction of the raising operation. In the lowered position (not shown), the retention bracket 107 and cutting element 72 assembly is loosely received between the sidewalls 112 and may be removed for cleaning or maintenance, e.g., sharpening or replacement. Threaded adjustment screws 118 are discussed and shown in FIGS. 7 and 8, however, it should be understood that any suitable adjustment method may be used such as, shims, hydraulic devices, or any suitable positioning methods.

Figure 6:
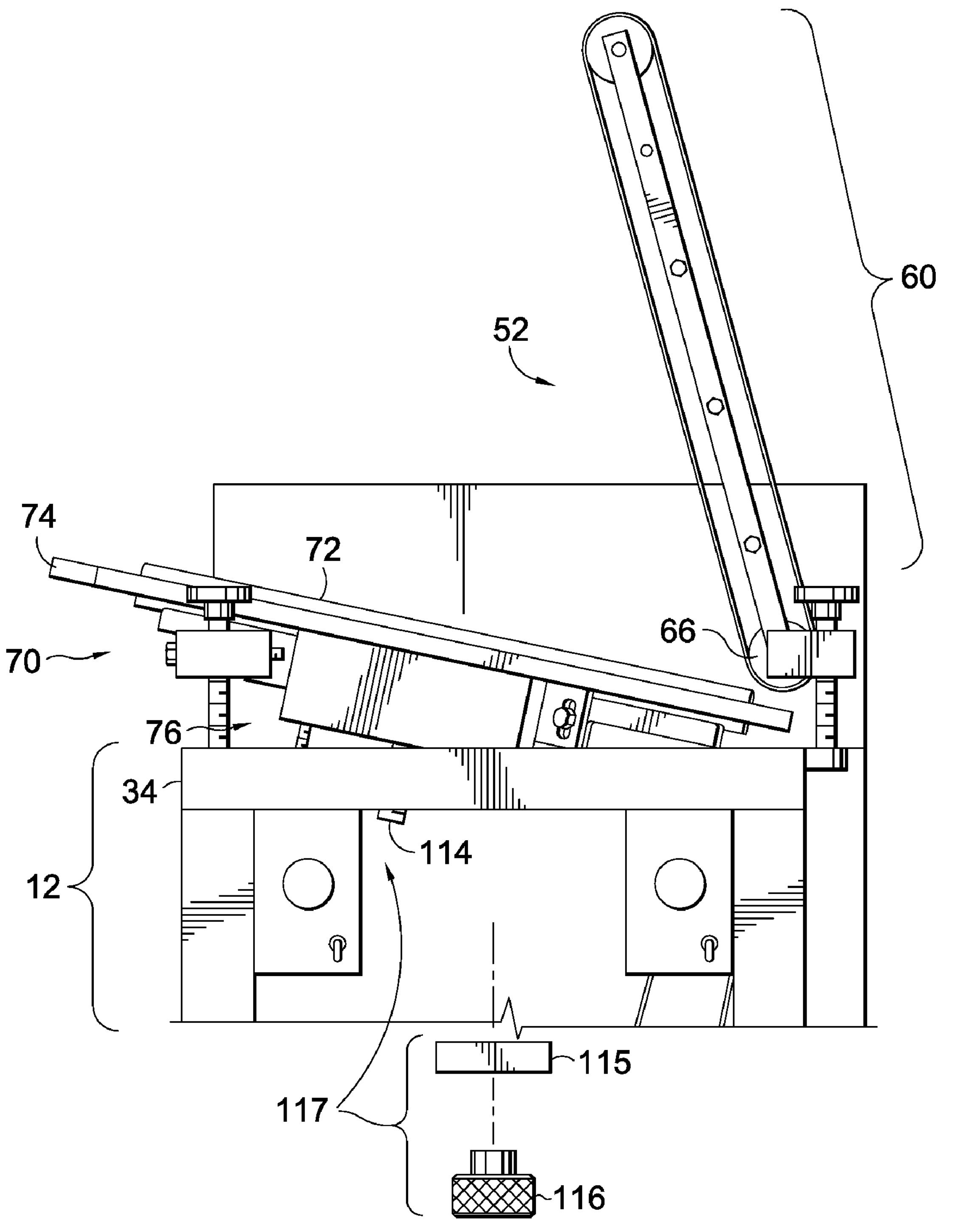
FIG. 6 is a view similar to FIG. 3, but with the cutting mechanism partially removed.

As depicted in FIG. 6, the release mechanism 117 is provided to both secure, and allow for disassembly, of the cutting mechanism 70 (i.e., blade mount device 76, cutting element 72, and compression plate 74) to the base 12. Specifically, the release mechanism 117 pivotably couples the blade mount device 76 to the upper support members 34, wherein tightening the release mechanism 117 fixes the orientation of the cutting element 72 beneath the conveyor device 52. The release mechanism 117 includes a threaded post 114, a bushing 115, and a knob 116. The threaded post 114 is centrally coupled with the lower plate 113 and extends downwardly therefrom. In one embodiment, the threaded post 114 is received in an opening (not shown) of the upper support member 34. The knob 116 is then threadably coupled to the threaded post 114 with the bushing 115 assembled therebetween, as depicted in FIG. 3 in the exploded view. Typically the bushing 115 is assembled in partial contact with the surface of the upper support member 34 that is opposite to the surface on which the blade mount device 76 rests. The knob 116 may be manufactured with interior threads to allow assembly on the threaded post 114 by machine operation, by the user's hand—wherein the outer diameter of a portion of the knob 116 is provided with knurling to reduce slippage when tightening—or by any other suitable method.

During assembly of the cutting mechanism 70 to the base 12, but before tightening the knob 116, the cutting mechanism 70 may be rotatably adjusted. Rotatable adjustment subsequently adjusts the angle of the cutting element 72 in relation to the drive mechanism 50. As shown in FIG. 5, the elongated slot 104, which receives the cutting element 72 therein, is in angular relation to the conveyor device 52. By rotatably adjusting the cutting element 72 to increase the angular relation—the cutting element 72 moves toward a perpendicular orientation—to the plurality of rollers 60, the pitch of the spiral incision decreases. If the cutting element 72 is rotatably adjusted such that the angular relation to the plurality of rollers 60 is decreased, the pitch of the spiral incision increases; that is, the spacing between complete helical turns is increased. The advantage is that both the pitch of the spiral incision and the depth of the incision, discussed above, may be adjusted. But once fixed, both the depth of the incision and pitch of the spiral are concomitantly held generally constant.

The operation of the spiral incision device 10 is best described with reference to FIGS. 1, 3, and 7. Initially, as shown in FIG. 1, the non-incised hotdogs 11—or any other type of generally cylindrical-shaped meat product as discussed above—are manually or automatically (based on rate of flow) fed into the drive mechanism 50 by way of the receiving channel 14. In one embodiment, the non-incised hotdogs 11 are gravity-fed in a widthwise manner and allowed to roll between the sidewalls 18. As such, this method of delivery to the drive mechanism 50 is adapted to high volume processing.

Upon receiving the non-incised hotdog 11, the drive mechanism 50 traps the non-incised hotdog 11 between the conveyor device 52 and the compression plate 74. As shown in FIG. 7, the processing belt 80 rotatably engages the non-incised hotdog 11 and propels it forward against the compression plate 74. The rate at which the non-incised hotdog 11 is propelled is determined by the proportional speed control 124 (FIG. 7) of the drive controls 54. That is, the drive controls 54, upon activation, allow the user to determine the rotational output of the motor 54, which is rotatably interconnected to at least one of the plurality of rollers 60 via the drive belt 96. Typically, the motor 54 transfers a constant torque through the drive mechanism 50 that is exhibited at the conveyor device 52.

The plurality of rollers 60 control the rotation of the processing belt 80 and provide constant downward pressure on the non-incised hotdog 11 as it is propelled toward the cutting element 72. With reference to FIG. 7, the cutting element 72 is angularly positioned in relation to the plurality of rollers 60. As the non-incised hotdog 11 is propelled over the cutting element 72, the non-incised hotdog 11 is incised by the cutting portion 130 and rolled by the processing belt 80 concomitantly. As discussed previously, the constant downward pressure provided by the plurality of rollers 60 in conjunction with the processing belt 80 results in a uniform depth of cut along the superficial spiral incision. In addition, the process of drawing over the cutting element 72 with a fixed angle results in spacing between the completed helical turns on the processed hotdog 13 is maintained generally invariant, i.e., uniform pitch of the spiral incisions.

Turning now to FIG. 1, the processed hotdogs 13 are propelled forward and out of the engagement of the drive mechanism 50 into the exit channel 16. Similar to the receiving channel 14, the exit channel 16 typically removes the incised hotdogs 13 widthwise to facilitate high volume processing. Upon exiting the spiral incision device 10, the processed hotdogs 13 may then be packaged for shipping or transported to a succeeding stage of processing.

Cleaning and maintaining the drive mechanism 50 and cutting mechanism 70 will now be discussed. In the embodiment depicted in FIG. 3, the conveyor device 52 may be rotated away from the cutting mechanism, i.e., moved from parallel-spaced relation, by the following steps: loosen and disengage the fasteners 86 that couple the guide bracket 82 to the forward support units 84; provide a rotational force to the front roller 62; and pivot the conveyor device 52 about the pivot bar 92 that is assembled to the rearward support unit 90. The rotated conveyor device 52, also shown in FIG. 5, allows for easy access to the cutting mechanism 70 and removal thereof, as discussed more fully above, without the complete disassembly of the spiral incision device 10. Rotation of the conveyor belt 52 back into an operation configuration is performed by executing the above steps in reverse order. Once in the operation configuration, as depicted in FIG. 1, the spiral incision device 10 is again prepared to accept and cut meat products at a constant pitch and uniform depth at a high or varied rate.

The present invention has been described in relation to particular embodiments, which are intended in all respects to be illustrative rather than restrictive. Alternative embodiments will become apparent to those skilled in the art to which the present invention pertains without departing from its scope.

It will be seen from the foregoing that this invention is one well adapted to attain the ends and objects set forth above, and to attain other advantages, which are obvious and inherent in the device. It will be understood that certain features and subcombinations are of utility and may be employed without reference to other features and subcombinations. This is contemplated. It will be appreciated by persons skilled in the art that the present invention is not limited to what has been particularly shown and described hereinabove. Rather, all matter herein set forth or shown in the accompanying drawings is to be interpreted as illustrative and not limiting.

What is claimed is:

1. An apparatus for making a spiral incision on a meat product, the apparatus comprising:

a base;

a compression plate supported by the base having an elongated slot therein;

a cutting element positioned in a substantially vertical orientation, the cutting element having a mounting portion and a cutting portion that projects upwardly through the elongated slot;

a plurality of rollers that are pivotably coupled to at least one guide bracket, the plurality of rollers being frictionally engaged by one or more flexible belts such that at least one roller is rotated concomitantly with another roller of the plurality of rollers;

a spacing device that adjustably couples the at least one guide bracket and the base such that the one or more flexible belts and compression plate are spatially arranged to rotatably engage a meat product therebetween, wherein the meat product is drawn over the cutting element making a spiral incision.

2. The apparatus of claim 1, wherein the cutting element is angularly disposed in relation to the at least one guide bracket.

3. The apparatus of claim 1, wherein the compression plate is pivotably coupled to the base.

4. The apparatus of claim 1, wherein the cutting element is an elongate blade that is adapted to making a spiral incision on more than one meat product concomitantly.

5. The apparatus of claim 1, wherein the apparatus further comprises a drive mechanism rotatably coupled to the plurality of rollers, wherein the drive mechanism automatically rotates the one or more flexible belts.

6. The apparatus of claim 5, wherein the drive mechanism comprises a motor that is electrically linked to a proportional speed control device.

7. The apparatus of claim 1, wherein the one or more flexible belts and compression plate are arranged in a substantially parallel-spaced relation.

8. The apparatus of claim 1, wherein the spacing device includes a pivot bar that is pivotably coupled to the at least one guide bracket, such that the one or more flexible belts may be angularly disposed in relation to the compression plate.

9. The apparatus of claim 1, wherein the apparatus further comprises a blade mount device that is fixedly attached to the compression plate and is adjustably coupled to the mounting portion of the cutting element.

10. The apparatus of claim 9, where in the blade mount device is adapted to adjust the cutting portion's distance of upward projection beyond the elongated slot.

11. The apparatus of claim 10, wherein the distance of upward projection beyond the elongated slot is substantially uniform along a section of the cutting element.

12. The apparatus of claim 11, wherein the distance of upward projection beyond the elongated slot results in a generally uniform depth of the spiral incision upon drawing the meat product over the cutting element.

13. The apparatus of claim 1, wherein the meat product is generally cylindrically shaped.

14. A mechanism for superficially incising a meat product which comprises:

a compression member having an upper surface and a lower surface, wherein the compression member includes an elongated slot therein;

a blade mount device, coupled to the lower surface of the compression member, having an adjustment device;

a cutting element positioned in a substantially vertical orientation, the cutting element having a mounting portion coupled to the adjustment device and a cutting portion that projects upwardly through the elongated slot beyond the upper surface of the compression member;

a plurality of rollers that are pivotably coupled to at least one guide bracket, the plurality of rollers being frictionally engaged by one or more flexible belts such that at least one roller is rotated concomitantly with another roller of the plurality of rollers;

a spacing device that is pivotably coupled to the at least one guide bracket and adjustably coupled to the compression member such that the one or more flexible belts and compression plate are spatially arranged to rotatably engage a meat product therebetween, wherein the meat product is drawn over the cutting element making a superficial incision.

15. The mechanism of claim 14, wherein the adjustment device is adapted to adjust the cutting portion's upwardly projecting distance beyond the upper surface of the compression member.

16. The mechanism of claim 15, wherein the cutting portion's upwardly projecting distance beyond the upper surface of the compression member is substantially uniform along the length of the cutting element.

17. The mechanism of claim 14, further comprising a drive mechanism that is rotatably coupled to at least one roller of the plurality of rollers.

18. The mechanism of claim 14, wherein the cutting element is orientated in an angular relation to the at least one guide bracket such that the superficial incision is a helix.

19. The mechanism of claim 18, wherein the cutting element is a elongate blade that forms the helix with a substantially uniform pitch.

20. A method for spirally incising a meat product, the method comprising the steps of:

providing an apparatus having a base, a compression plate supported by the base having an elongated slot therein, a cutting element positioned in a substantially vertical orientation, the cutting element having a mounting portion and a cutting portion that projects upwardly through the elongated slot, a plurality of rollers that are pivotably coupled to at least one guide bracket, the plurality of rollers being frictionally engaged by a one or more flexible belts such that at least one roller is rotated concomitantly with another roller of the plurality of rollers, and a spacing device that adjustably couples the at least one guide bracket and the base such that the one or more flexible belts and compression plate are arranged in substantially parallel-spaced relation to rotatably engage a meat product therebetween;

activating a drive mechanism rotatably coupled to the plurality of rollers; and drawing the meat product over the cutting element making a spiral incision.

* * * * *